Feb. 2, 1965 L. C. PHILLIPS 3,167,915
CONTROL SYSTEM FOR A MATERIAL SPREADER MACHINE
Filed Nov. 6, 1962 2 Sheets-Sheet 1
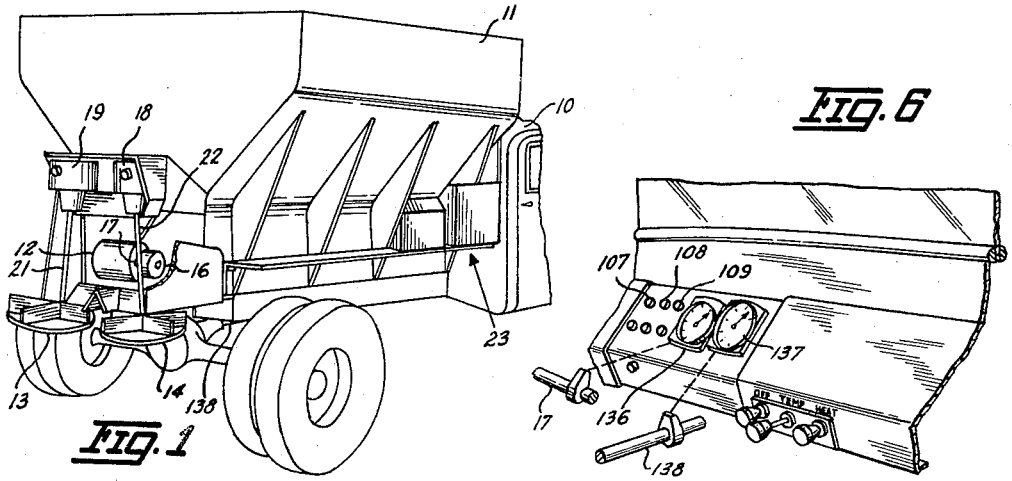
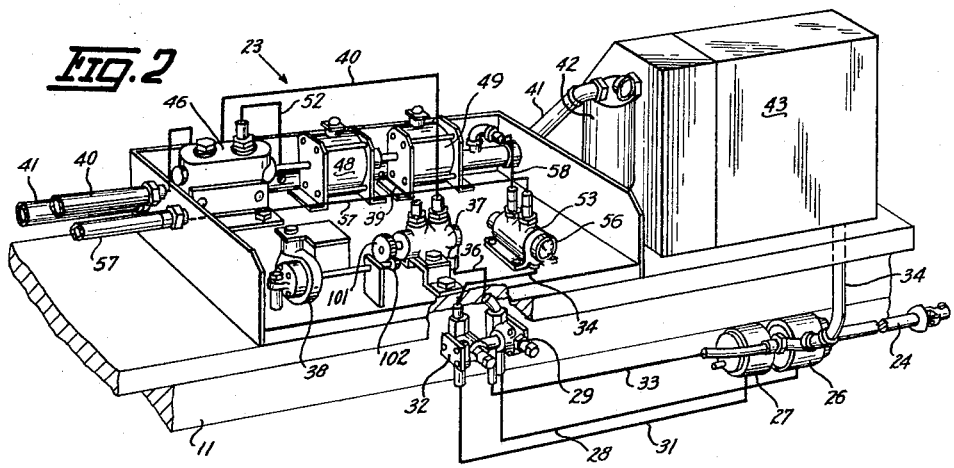
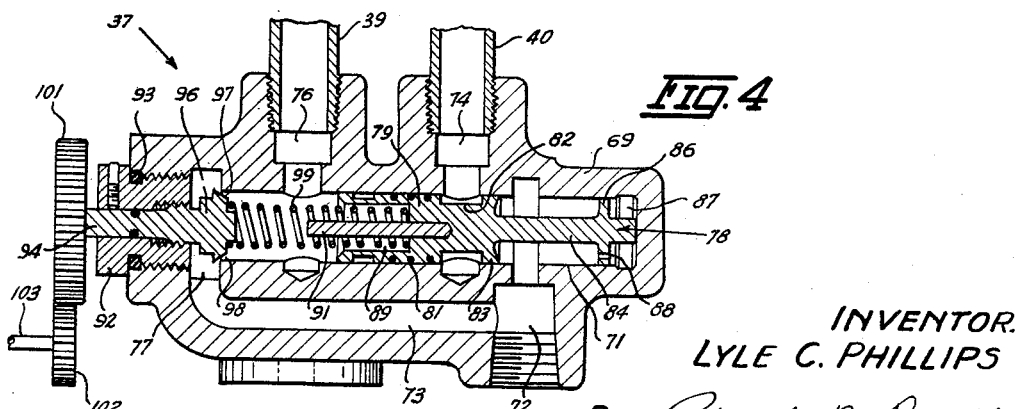
INVENTOR.
LYLE C. PHILLIPS
BY Rudolph L. Lowell
ATTORNEY.

Feb. 2, 1965   L. C. PHILLIPS   3,167,915
CONTROL SYSTEM FOR A MATERIAL SPREADER MACHINE
Filed Nov. 6, 1962   2 Sheets-Sheet 2
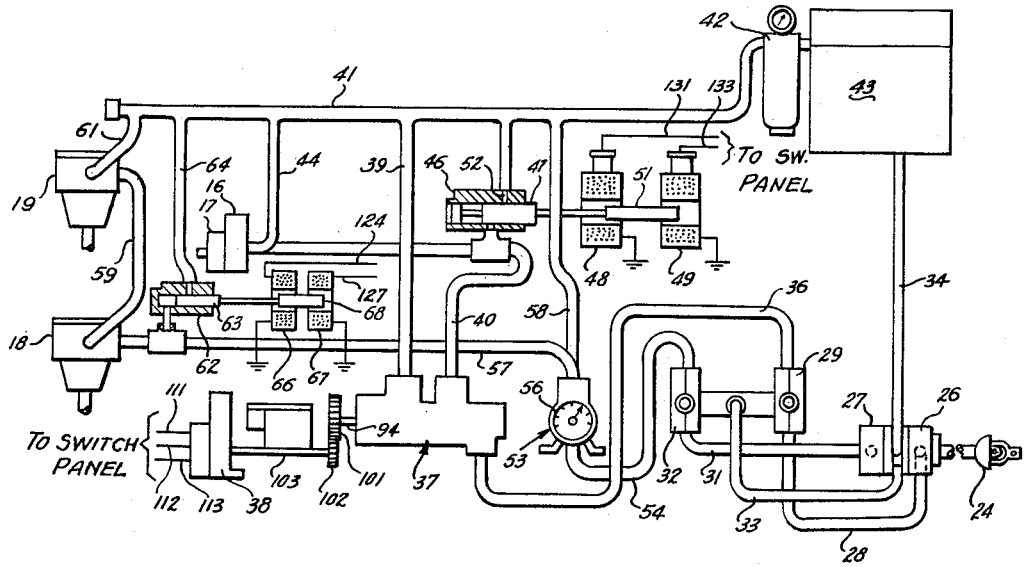
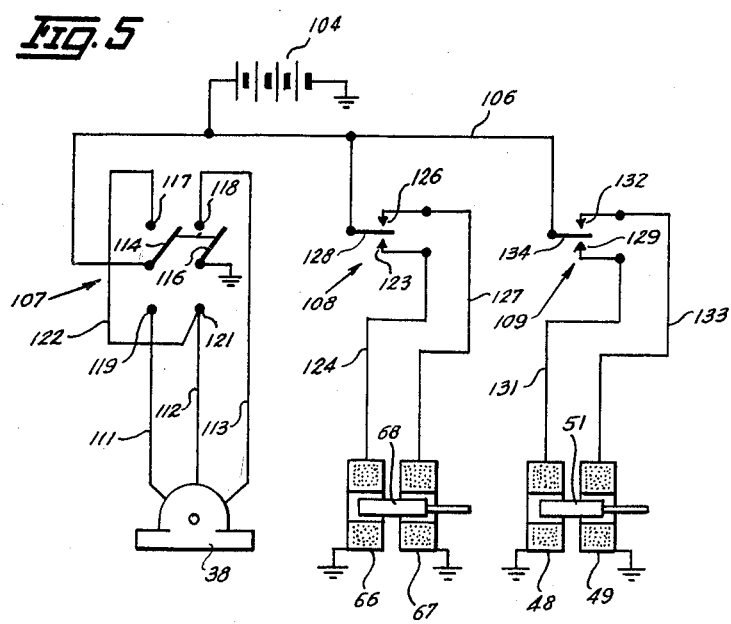
INVENTOR.
LYLE C. PHILLIPS
BY Rudolph L. Lowell
ATTORNEY.

United States Patent Office 3,167,915
Patented Feb. 2, 1965

3,167,915
CONTROL SYSTEM FOR A MATERIAL
SPREADER MACHINE
Lyle C. Phillips, Cedar Rapids, Iowa, assignor to Henderson Manufacturing Co., Manchester, Iowa, a corporation of Iowa
Filed Nov. 6, 1962, Ser. No. 235,739
1 Claim. (Cl. 60—52)

The present invention relates to a fluid control system for a conveyor drive motor and more particularly to a fluid power transmission system having adjustable valve means to control the speed of a conveyor drive motor.

An object of the invention is to provide a motor vehicle having a bulk material body containing a bulk material unloading conveyor with a vehicle engine operated fluid power transmission system which is operable to change the speed of the conveyor so that a selected ratio of the speed of the conveyor relative to the rate of ground speed of the motor vehicle can be maintained.

Another object of the invention is to provide a vehicle having a bulk material body which contains a bulk material unloading conveyor and bulk material distributing fans with a power supply fluid power transmission system which is operable to drive the conveyor and fans and adjustably control the speed of the conveyor relative to the ground speed of the vehicle.

A further object of the invention is to provide a conveyor control system for a conveyor mounted on a motor vehicle which is operable to control the speed of the conveyor relative to the rate of travel of the vehicle in response to the position of a manually operated switch mounted within the cab of the vehicle.

Still another object of the invention is to provide a relatively inexpensive, durable, and easy to operate fluid control system for a conveyor drive motor.

According to the invention, a motor vehicle with a bulk material body has a material unloading conveyor, which is driven through a fluid power transmission system operatively connected to the conveyor and the motor of the vehicle. The conveyor is provided with a fluid drive motor the speed of which, relative to the speed of the motor vehicle, is regulated by controls positioned within the cab of the motor vehicle. The transmission system includes a fluid flow regulator valve that is controlled by a reversible motor to vary the fluid pressure to the conveyor drive motor thereby controlling the speed of the conveyor. A control within the cab actuates the reversible motor. The vehicle operator can, therefore, adjust the speed of the conveyor motor relative to the vehicle motor to provide for a uniform distribution of material over the ground.

The exact nature of the invention as well as other objects and advantages thereof will be readily apparent from the consideration of the following specification relating to the annexed drawing in which:

FIGURE 1 is a perspective view of a bulk material carrying body mounted on a truck showing the general combination of the material unloading apparatus and control system therefor;

FIGURE 2 is a perspective view of the fluid control system for the bulk material unloading apparatus shown in FIGURE 1;

FIGURE 3 is a schematic diagram of the fluid power transmission system including the fluid control system shown in FIGURE 2;

FIGURE 4 is a longitudinal sectional view of the fluid flow regulator valve for the conveyor motor;

FIGURE 5 is a circuit diagram of the electrical controls for the fluid control system; and FIGURE 6 is a perspective view of the manual controls of the system on the instrument panel within the cab of the truck.

Referring to the drawing, there is shown in FIGURE 1 a motor vehicle 10 such as a truck carrying a bulk material handling body 11. A material unloading conveyor 12 and a pair of rotatable fans 13 and 14 positioned adjacent the trailing end of the conveyor are secured to the body and function to disperse the bulk material being moved from the body. The conveyor 12 is driven by a hydraulic fluid motor 16 connected to the conveyor by a drive shaft 17. Corresponding to the fans 13 and 14 are a pair of series connected hydraulic fluid motors 18 and 19 which are connected to the fans 13 and 14 by means of drive shafts 21 and 22 respectively.

The motors 16, 18 and 19 form part of a fluid power transmission system 23 shown in FIGURES 2 and 3 and are driven by fluid pressure from tandem pumps 26 and 27. A drive shaft 24 of the truck 10 is coupled to and operates the tandem pumps 26 and 27. The output conduit 28 of the pump 27 is connected to a pressure relief valve 29 and the output conduit 31 of the pump 26 is connected to a pressure relief valve 32. A common passage 33 interconnects the relief valves 29 and 32 with the intake conduit 34 for the pumps 26 and 27. A fluid conduit 36 interconnects the pressure relief valve 29 with a fluid flow regulator valve 37 which is operated by a reversible motor 38 to regulate the flow of fluid to the valve output conduits 39 and 50. The reversible motor 38 is provided with limit switches which define the maximum rotational movement of the motor drive shaft 103 thereby preventing damage to the valve 37 and spur gears 101 and 102. The conduit 39 connects the valve 37 with a return conduit 41 which returns the fluid through a filter 42 into a reservoir 43.

The second output conduit 40 of the valve 37 connects the valve 37 with the inlet of the fluid pressure operated motor 16 of the conveyor 12. A conduit 44 interconnects the outlet of the motor 16 with the return conduit 41 thereby permitting the fluid to flow from the valve 37 through the conduit 40 into the motor 16 and through the conduit 44 into the return conduit 41. The rotational speed and the torque of the drive shaft 17 of the motor 16 is proportional to the amount of fluid pressure supplied to the motor 16 via the conduit 40.

A by-pass valve 46 is connected between the conduits 40 and 41 and operates to directly connect the conduit 40 with the return conduit 41 thereby by-passing the fluid motor 16. The valve 46 contains a piston 47 which is moved to an open and closed position by a pair of solenoids 48 and 49. As shown in FIGURE 3 the piston 47 is in the closed position as it blocks the passage 52 which interconnects the conduit 40 with the return conduit 41. The common core 51 of the solenoids 48 and 49 is connected to the piston 47. Energization of either of the solenoids 48 or 49 moves the core 51 and the piston 47 to open and close the valve 46.

The pump 27 supplies the fluid to operate the series connected distributor hydraulic motors 18 and 19. The pressure relief valve 32 for the pump 27 is connected to an adjustable by-pass hydraulic flow regulator 53 by means of a conduit 54. The flow regulator valve 53 may be regulator valve Model No. 13-2-6 manufactured by the Fluid Power Accessories, Inc., or any other pressure-compensated flow regulator of adequate capacity. The regulator valve 53 contains a knob 56 which is manually adjustable to regulate the flow of fluid through the valve, a regulated flow output conduit 57, and a by-pass flow conduit 58. The valve 53 is connected with the return conduit 41 by the conduit 58 thereby permitting the by-pass fluid to return to the reservoir 43. The regulated flow conduit 57 is connected to the fluid motor 18 the outlet of which is fluid connected to the inlet of the motor 19 through the conduit 59, and with the outlet of the motor 19 being connected by a conduit 61 with the return conduit 41.

A by-pass valve 62 having a piston 63 is connected to the conduit 57 and a conduit 64 to interconnect the conduits 57 and 41. The valve 62 is operable to by-pass the flow of fluid from the distributor motors 18 and 19. A pair of solenoids 66 and 67 having a common core 68 connected to the piston 63 move the piston 63 to open and close the valve 62. Energization of either of the solenoids 66 and 67 will move the valve 63 to either open or close the fluid passages through the valve. When the valve is closed as shown in FIGURE 3 the fluid in the conduit 57 is directed to the motor 18. When the piston 63 is in the open position the fluid will flow through the valve 62 into the conduit 64 and the return conduit 41 thereby by-passing the fluid motors 18 and 19.

The flow regulator valve 37 as shown in FIGURE 4 has a body 69 formed with a longitudinal bore 71 which is closed at one end and open at the opposite end. An inlet port 72 adjacent the closed end of the bore 71 opens into the bore 71 and a longitudinal passage 73 connects the intake port 72 with the bore 71 adjacent the open end of the body 69. A by-pass or outlet port 74 in the body 69 opens into the bore 71 downstream from the inlet port 72. A regulated flow outlet port 76 opens into the bore 71 downstream from the inlet opening 77 of the passage 73. The flow of fluid into the outlet passages 74 and 76 is controlled by a spool 78 slidably disposed in the bore 71 to selectively open and close the outlet ports 74 and 76.

The spool 78 has a head 79 which retains a plurality of annular seals 81 in frictional contact with the wall of the bore 71. The head 79 separates the by-pass outlet port 74 from the regulated outlet port 76 and is provided with an annular groove 82 adjacent the port 74 forming a circular wall 83. The wall 83 is normally positioned between the inlet port 72 and the outlet port 74. The spool 78 has a longitudinally extended neck 84 projecting from the head 79 and is adapted to engage the closed end of the body 69. The neck 84 has an integral collar 86 in engagement with the cylindrical surface of the bore 71 and forms a chamber 87 adjacent the closed wall of the body 69. A bleed hole 88 in the collar 86 permits fluid trapped in the chamber 87 to flow toward the inlet port 72. The chamber 87 thus functions as a dashpot to reduce the throttling effect of the spool 78.

The head 79 has a longitudinally extended recess or cavity 89 within which is positioned in a stop pin 91 having one end secured to the base of the recess 89. The pin 91 functions to limit the movement of the spool.

An adapter plug 92 is threadably positioned in the open end of the body 69 and is in sealing engagement therewith by means of an annular seal 93. An adjustable screw 94 is threadably secured through the adapter plug 92 and is positioned in alignment with the axis of the bore 71. The screw 94 has a head 96 at its inward end. The outer peripheral surface 97 of the head 96 is tapered inwardly and is movable toward and away from the annular edge 98 of the body 69 forming the open end of the bore 71. The tapered surface 97 and the annular edge 98 form an adjustable restriction passage which regulates the flow of fluid from the inlet passage 73 to the outlet passage 76.

A compression spring 99 is positioned within the recess 89 of the spool 78 and extends into engagement with the inward end of the head 96 of the screw 94. The spring 99 normally biases the spool 78 into engagement with the closed end of the body 69 thereby positioning the valve in the bore 71 to close the outlet port 74 and open the outlet port 76.

The screw 94 is reversibly rotated by the reversible motor 38. A driven spur gear 101 is drivably connected to the outer end of the screw 94 and engages a driving spur gear 102 which is connected to the drive shaft 103 of the reversible motor 38. Rotation of the screw 94 moves the tapered surfaces 97 toward and away from the edge 98 thereby varying the restricted opening between the inlet passage 73 and the outlet port 76.

The electrical circuit for controlling the reversible motor 38 and the valve operating solenoids 48 and 49 and 66 and 67 is shown in FIGURE 5. The power supply is derived from a battery 104 which may be the battery of the vehicle 10. The battery 104 is connected by a conductor 106 to a motor reversing switch 107 and solenoid switches 108 and 109. The switch 107 is connected by three conductors 111, 112 and 113 to the motor 38. Switch 107 has a pair of arms 114 and 116 which are adapted to engage a first pair of contacts 117 and 118 and a second pair of contacts 119 and 121. The contact 117 is conductively connected to the contact 121 by means of a conductor 122. The conductors 111, 112 and 113 are connected to the contacts 119, 121 and 118, respectively. The arm 114 is connected to the positive terminal of the battery by the conductor 106 and the arm 116 is connected to the ground.

When the arms 114 and 116 engage the contacts 117 and 118 the power is supplied to the motor 38 via the conductors 122 and 112 and back to the ground via the conductor 113 and the arm 116. In order to reverse the direction of the motor 38 the arms 114 and 116 are moved into engagement with the contacts 119 and 121. The power is then supplied to the motor 38 through the arm 114 and the conductor 111 and back to ground through the conductor 112 and the arm 116.

The switch 108 has a contact 123 connected to the solenoid 66 by a conductor 124 and a contact 126 connected by a conductor 127 to the solenoid 67. An arm 128 connected to the conductor 106 is selectively movable into engagement with either the contact 123 or the contact 126 to selectively energize either the solenoid 66 or the solenoid 67.

The switch 109 has a contact 129 connected to the solenoid 48 by a conductor 131 and a contact 132 connected to the solenoid 49 by a conductor 133. An arm 134 connected to the conductor 106 is selectively movable into engagement with either the contact 129 or the contact 132 to selectively supply power to either the solenoid 48 or the solenoid 49.

As shown in FIGURE 6 the switches 107, 108 and 109 are mounted in the dash within the cab of the vehicle in a position where they may be readily operated by the driver of the vehicle.

Mounted on the dash adjacent to the switches are a pair of tachometers 136 and 137. The tachometer 136 is mechanically coupled to the drive shaft 17 of the conveyor 12 and functions to sense the rotational speed of the drive shaft. The tachometer 137 is mechanically coupled to the drive shaft 138 of the motor vehicle 10 and functions to sense the rotational speed of the drive shaft. Operation of the switch 107 controls the angular position of the drive shaft of the reversible motor 38 which in turn operates the valve 37 thereby controlling the speed of the conveyor shaft 17. The driver of the vehicle can by the operation of the switch 107 maintain a substantially constant ratio between the speeds of the drive shaft 138 and the conveyor drive shaft 17. With a constant ratio between the respective drive shafts the distribution of the bulk material being unloaded from the body of the vehicle will remain substantially constant during a change of linear speed of the vehicle.

The fluid power control system operates to adjustably control the speed of the conveyor 12. The pump 26 driven by the motor vehicle moves the hydraulic fluid from the reservoir 23 into the discharge conduits 28 and 36 to the flow regulator valve 37. The valve 37 directs under pressure the flow of the hydraulic fluid to two separate output hydraulic conduits 39 and 40. The valve 37 is adjustable by the reversible motor 38 to regulate the flow of fluid in the output conduit 39 which is connected to a return conduit 41 which directs the fluid back to the reservoir 43. The reversible motor 38 is operated by the position of the switch 107 located in the cab of the vehicle 10. The conduit 40 is connected to the by-pass port 74 of the valve 37 and to the conveyor motor 16. The amount of fluid which is permitted to flow through the conduit 40 determines the torque and speed developed by the conveyor motor 16. This pressure is regulated by the reversible motor 38 which adjusts the position of the tapered surface 97 of the head of the screw 94 relative to the edge 98 of the body 69 whereby the amount of fluid supplied to the valve 37 is shunted back to the reservoir without going through the conveyor drive motor 16.

As shown in FIGURE 4 the fluid supplied to the inlet port 72 urges the spool 78 to the left thereby opening the outlet port 74. Part of the fluid flows through the lateral passage 73 and through the restricted opening formed by the tapered surface 97 of the screw 94 and the edge 98 of the valve body 69. This fluid moves out the outlet port 76 into the conduit 39 and back to the reservoir 43. The amount of fluid which flows back to the reservoir through the restricted passage of the valve 37 determines the amount of fluid which flows out of the outlet port 74 into the conduit 42 to the conveyor drive motor 16.

In order to stop the motor 16 the valve 46 by-passes the fluid in the conduit 40 back to the return conduit 41 whereby all of the fluid supplied to the valve 37 is returned to the reservoir 43 without passing through the motor 16. The valve 46 is operated by the solenoids 48 and 49 which are energized by the operation of a switch 109 located within the cab of the vehicle.

The pump 27 draws the hydraulic fluid from the reservoir 43 and forces the fluid under pressure to the conduits 31 and 54 to a manually regulated flow regulator valve 53. The valve 53 has an outlet by-pass conduit 54 which directs the by-pass fluid back to the reservoir 43 and a regulated flow conduit 57 which directs the flow of fluid under pressure to the distributor motors 18 and 19. The amount of fluid pressure supplied to the motors 18 and 19 is manually adjusted by rotation of the knob 56 on the outer end of the valve 53. The distributor motors 18 and 19 are connected in series by the conduit 50 and discharge the fluid back to the reservoir 43 via the common return conduit 41. The by-pass valve 62 operated by solenoids 66 and 67 which are controlled by the switch 108 mounted in the cab of the vehicle functions to shunt the fluid pressure supplied to the conduit 57 back to the return conduit 41 without passing through the distributor motors 18 and 19 thereby disabling these motors.

As shown in FIGURE 6 the operator of the vehicle 10 by visually observing the tachometers 136 and 137 is supplied with information which indicates the relative speeds of the conveyor and the drive shaft of the vehicle. By operating the switch 107 the speed of the conveyor can be either increased or decreased which enables the operator to maintain a substantially constant ratio between the speed of the conveyor and the speed of the drive shaft of the vehicle.

While there have been shown, described, and pointed out the fundamental novel features of the invention as applied to the preferred embodiment, it will be understood that various omissions, substitutions, changes in form, and details of the system illustrated may be made by those skilled in the art without departing from the spirit of the invention. It is intended to be limited only as indicated by the scope of the following claim.

I claim:

A fluid power transmission system comprising:
 (a) fluid motor means having an inlet port and an outlet port,
 (b) pump means having an inlet port and an outlet port operable to supply fluid under pressure to said fluid motor,
 (c) a reservoir fluidly connected to said inlet port of the pump means and said outlet port of said fluid motor means to receive fluid from said motor means and supply fluid to said pump means,
 (d) valve means having a longitudinal bore, an inlet port adjacent each end of said bore and in fluid communication therewith said inlet ports being fluidly connected to said pump means, a by-pass outlet port and a regulated flow outlet port in fluid communication with said bore between said inlet ports, said by-pass outlet port being fluidly connected to the inlet port of the fluid motor means and said regulated flow outlet port being fluidly connected to said reservoir, a spool member slidably positioned in said bore to separate the outlet ports and open and close the by-pass outlet port, and adjustable screw forming a restricted passage with said bore between an inlet port and the regulated flow outlet port, a compression spring engaging said screw and said spool to bias said spool to close said by-pass outlet port whereby the amount of fluid which flows out of the by-pass port is regulated by the size of the restricted passage formed by the adjustable screw and bore,
 (e) a reversible electric motor connected to said adjustable screw for the controlling of the size of the restricted passage, and
 (f) switch means operable to reversibly connect said electric motor to a source of electric power.

References Cited in the file of this patent
UNITED STATES PATENTS

| 2,799,510 | Schmidt | July 16, 1957 |
| 2,912,286 | Evans | Nov. 10, 1959 |
| 2,988,368 | Kerr | June 13, 1961 |

FOREIGN PATENTS

| 924,500 | France | Mar. 10, 1947 |